US 6,640,979 B1

(12) United States Patent
Mayfield

(10) Patent No.: US 6,640,979 B1
(45) Date of Patent: Nov. 4, 2003

(54) MOTORCYCLE PARKING STAND

(76) Inventor: William Rodgers Mayfield, 1103 Collinwood St., Opelika, AL (US) 36801

( * ) Notice: Subject to any disclaimer, the term of this patent is extended or adjusted under 35 U.S.C. 154(b) by 0 days.

(21) Appl. No.: 10/116,592

(22) Filed: Apr. 4, 2002

Related U.S. Application Data

(60) Provisional application No. 60/281,399, filed on Apr. 5, 2001.

(51) Int. Cl.[7] ................................................. A47F 7/00
(52) U.S. Cl. ............................ 211/20; 211/22; 224/924
(58) Field of Search ........................... 211/20, 17, 22; 224/924

(56) References Cited

U.S. PATENT DOCUMENTS

| 611,401 | A | * | 9/1898 | White | |
|---|---|---|---|---|---|
| 3,430,983 | A | * | 3/1969 | Jones | |
| 3,542,157 | A | * | 11/1970 | Noah | |
| 3,785,517 | A | * | 1/1974 | Brajkovich | 211/20 |
| 5,301,817 | A | * | 4/1994 | Merritt | 211/20 X |
| 5,464,076 | A | * | 11/1995 | Benedetto | |
| 5,944,198 | A | * | 8/1999 | Ihalainen | 211/20 X |
| 5,988,402 | A | * | 11/1999 | Mayfield | 211/20 |

* cited by examiner

*Primary Examiner*—Robert W. Gibson, Jr.

(57) ABSTRACT

A motorcycle parking stand is disclosed that utilizes three shoes oriented to engage a motorcycle wheel at different points around the circumference of the wheel thus maximizing the stabilizing effect of the structure. The shoes are generally wedge shaped or of a shape that resembles the profile of the tire so as to come in contact with the outer edge of the treaded surface of the tire. The first two shoes are pivotally mounted to the stand structure and are fixed in relation to each other. A third shoe is affixed to the forward part of the stand structure to arrest the forward motion of the wheel and to provide support. Engagement occurs by pushing the motorcycle wheel into contact with the pivoting shoes which causes forward rotation of said shoes until the axle of the wheel is forward of the pivot point of the shoes thus enabling gravity to hold the wheel in contact with the front shoe. A variation of this stand is disclosed where each of the first two pivotally mounted shoes are in halves with both right and left half respectively fixed to a common pivot point oriented at some angle from the perpendicular to the longitudinal axis of the stand structure. The shoes are interconnected so as to provide concomitant rotation of the right and left sides. Rotation of the shoes results in a clamping effect on the wheel and increased stability.

9 Claims, 4 Drawing Sheets

MOTORCYCLE PARKING STAND

CROSS REFERENCE TO RELATED APPLICATIONS

This application claims the filing date of previously filed provisional application No. 60/281,399, filed Apr. 5, 2001.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates to motorcycles particularly to motorcycle stands. The invention discloses a motorcycle parking stand that engages the front wheel of a motorcycle by simply rolling or riding the motorcycle into the stand. The stand automatically supports the motorcycle securely in an upright position by engaging the front wheel or rear wheel.

The concept of a parking stand to hold a motorcycle upright by the front wheel is not a new one. A stand of this type is described in this applicant's issued U.S. Pat. No. 5,988,402. Others include U.S. Pat. No. 5,735,410 of Kallstrom; U.S. Pat. No. 5,301,817 of Merritt; U.S. Pat. No. 4,437,597 of Doyle, and U.S. Pat. No. 3,785,517 of Brajkovich. Perhaps the prior art closest to the present invention is described in International Application Number PCT/GB96/01276. The stand there described has two angular, wedge shaped shoes that provide support at 4 points inside each shoe. The limitation of this stand are apparent from the fact the support points of each shoe are concentrated together and the two shoes generally hold the wheel in two locations that are oriented at points generally opposite one another on the wheel; this effectively holds the wheel in only two locations allowing instability. Another limitation of this stand is that when a wheel sits in the wedge shaped shoes for a long period of time, the wheel can become stuck and extraction made rather difficult. The present invention addresses the stability and "sticktion" issues of the prior art.

BRIEF SUMMARY OF INVENTION

It is the object of the present invention to provide a stand that will hold a motorcycle in a vertical position while requiring only that the motorcycle be driven or pushed into the stand for engagement.

It is a further object of the invention to provide a stand of simple design that provides good stability and reduces the sticking problems encountered in some of the prior art.

These and other objects and advantages of the stand are accomplished in a novel combination of components including a first and second shoe connected pivotally to the stand structure. A third shoe is attached to the stand structure at a point forward and above the first and second shoes. As the motorcycle is rolled into the stand, engagement of the wheel with the first and second shoes initiates forward rotational motion of said first and second shoes and as the axle of the wheel passes over the pivot point of the said first and second shoes, gravity holds the wheel in contact with the third shoe. The shoes are oriented to provide maximum stability by engaging the wheel in three distinct, well-spaced locations around the diameter of the wheel.

A variation of the stand structure described above provides for the first and second shoes to engage the wheel with a clamping action. This action is accomplished by providing each of the first and second shoes to be split in half and the right side halves of the shoes connected together in an assembly with a common pivot axis and the left halves also connected together in an assembly with a common axis of rotation. The respective axes of each of the shoe assemblies are oriented at some angle not exactly perpendicular to the longitudinal axis of the stand. The shoe structures are designed such that the two halves are interconnected to provide concomitant motion and still allow for the clamping effect. Forward rotation causes the two halves of each shoe to move generally inward together and clamp the wheel. This motion also enables the shoes to "open" on removal and the wheel to disengage freely from the stand.

BRIEF DESCRIPTION OF THE SEVERAL VIEWS OF THE DRAWING

The foregoing objects, advantages, and features, as well as other objects and advantages, will become more apparent with reference to the description and drawings below, in which like numerals represent like elements and in which.

DETAILED DESCRIPTION OF THE INVENTION

Figure 1:
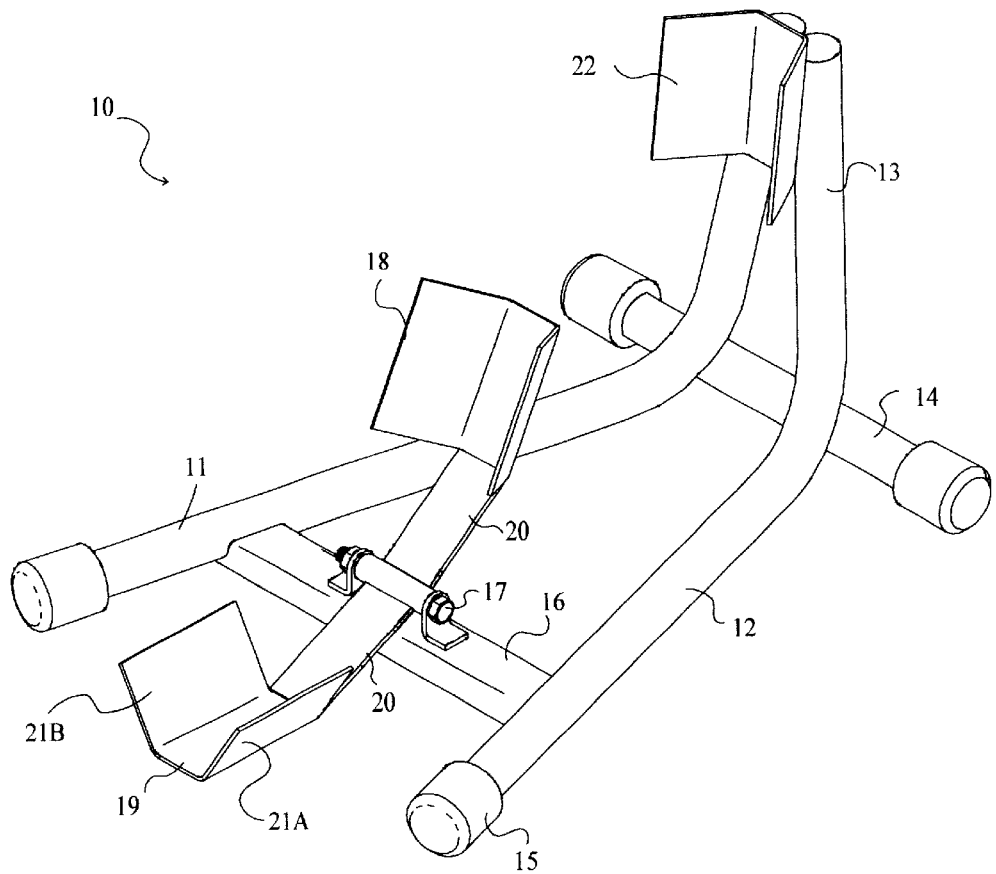
FIG. 1 is a respective view of the motorcycle stand ready to receive a wheel.
Figure 2:
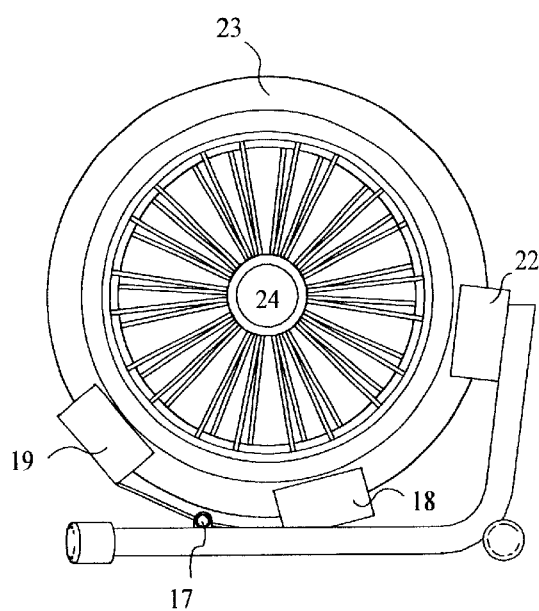
FIG. 2 is a elevational view of the stand with a wheel in the engaged position.

With reference to the drawings in which like reference numerals designate like or corresponding parts throughout the various views and with particular reference to FIG. 1 and FIG. 2, the stand of the present invention is designated generally at 10. The stand 10 includes a base 11 comprising a pair of laterally spaced longitudinal tubes each having a horizontally disposed portion 12 and a vertically disposed portion 13. A stabilizing tube 14 is attached to the tubular base 11 at the transition from horizontal to vertical and provides stability for the stand base 11. Rubber feet 15 may be provided to further enhance the stability of the structure. The base 11 is not the only base structure contemplated by this invention. Base structure may be by means of a flat steel plate for instance, or a modification of the tubular configuration described herein. Material choices such as aluminum or composites are also contemplated for all components.

A pivot support structure 16 is provided and is centrally and transversely mounted between the rearward portion of horizontal tubes 12 of base 11. Connected longitudinally to pivot support structure 16 is a pivot axis 17. Shoes 18 and 19 are connected pivotally to support structure 16 through pivot axis 17 by means of a support structure 20. Shoes 18 and 19 are constructed in a general wedge shape with opposing sides 21A and 21B so as to resiliently engage opposite sides of wheel 23 (See FIG. 2). The contacting surfaces of opposing sides 21A and 21B may further be coated with a non-stick surface or coating such as a phenolic plastic or Teflon to prevent a wheel from sticking in shoes 18 and 19. An upper shoe 22 is mounted to the upper ends of the vertical portion of the frame 13.

With reference to FIG. 2, the shoes 18, 19 and 22 are oriented such that they will provide generally tangential contact with a motorcycle wheel 22 at three distinct points around the perimeter of the wheel 23. The orientation of the shoes 18, 19 and 22 is such that full engagement of the wheel 23 will allow the axle of the wheel 24 to be forward of the pivot axis 17 thus enabling gravity to hold the motorcycle securely in the stand.

Figure 3:
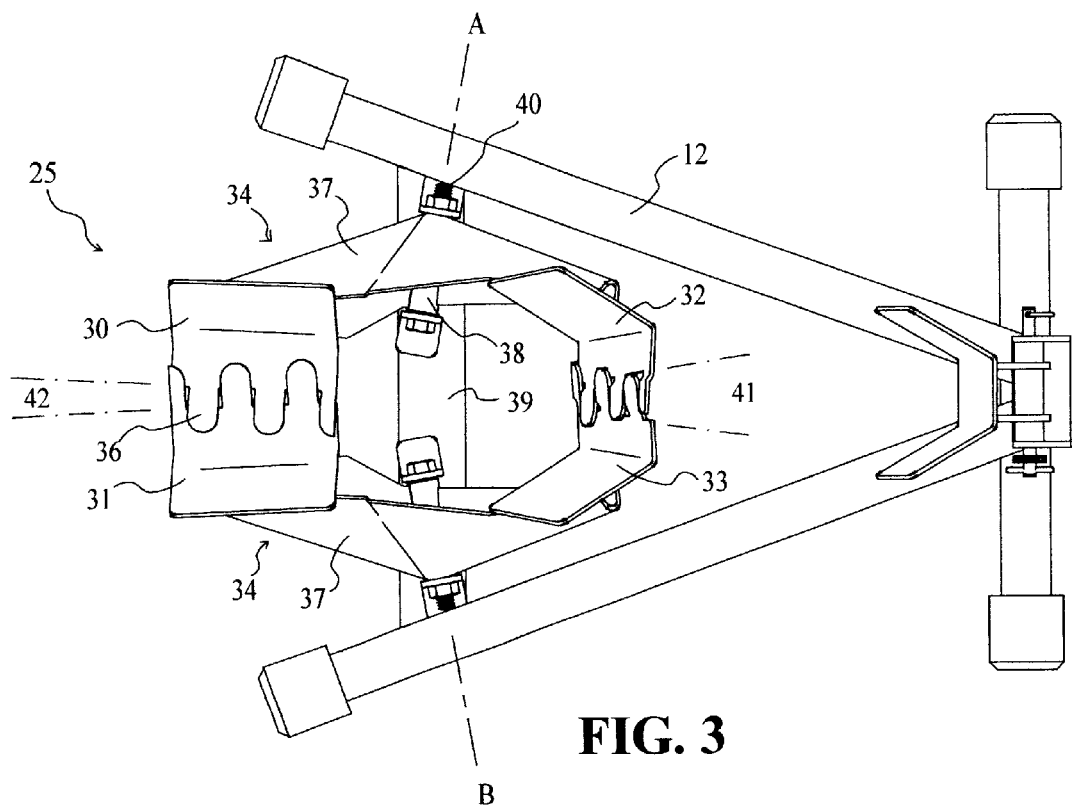
FIG. 3 is a plan view of the alternative embodiment ready to receive a wheel.
Figure 6:
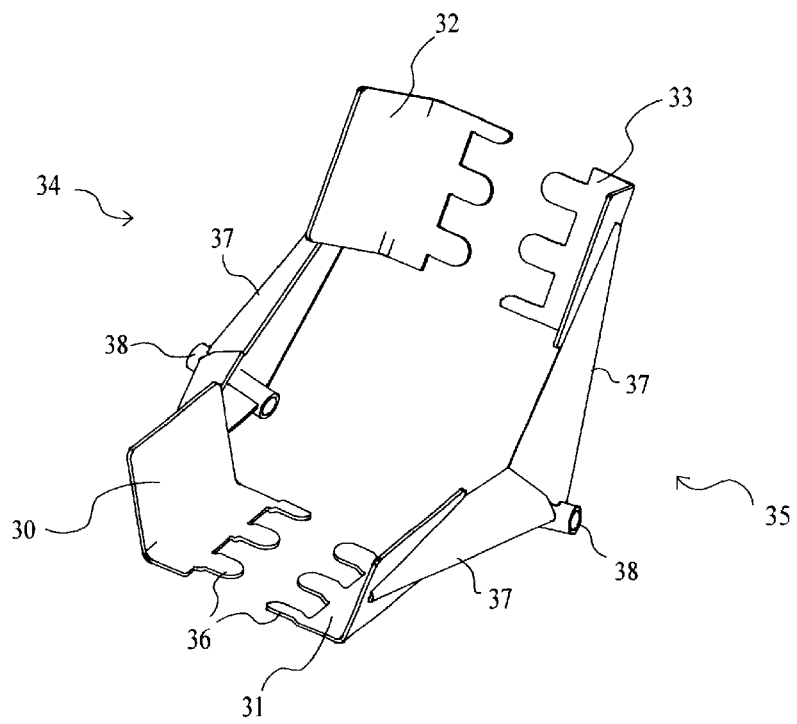
FIG. 6 is a perspective view of the engaging means of the alternative embodiment.
Figure 7:
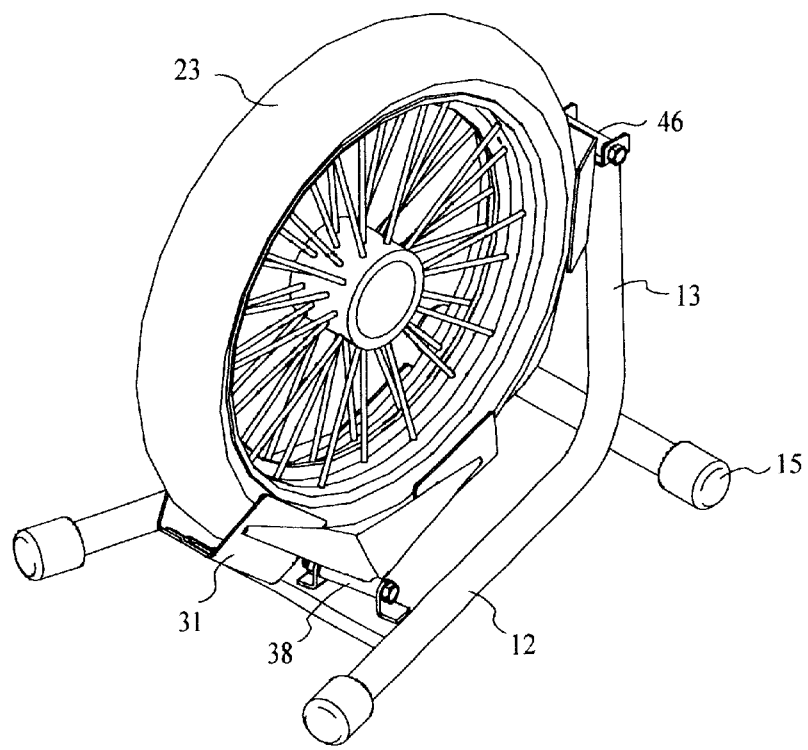
FIG. 7 is a perspective view of the stand with a wheel engaged, provided for publication.

The alternative embodiment shown in FIG. 3 has a similar base 11 as the stand of FIG. 1 but the primary engaging means shown generally at 25 provides a clamping effect on the motorcycle wheel. The alternative embodiment modifies the shoes 18 and 19 of FIG. 1 and divides them into interlocking shoe halves 30, 31, 32, 33 of FIG. 3 and the respective shoes welded or otherwise fabricated into two opposing assemblies shown generally as 34 and 35 in FIG. 2 and FIG. 6. Each shoe assembly 34, 35 has a support structure 37 that connects each shoe half to a pivot means 38 to complete the assembly. Also each of the shoe assemblies 34, 35 has a plurality of offset interlocking tabs 36 to fit into the opposing shoe assembly to cause concomitant motion of the two shoe assemblies 34 and 35. The tabs 36 are sized and spaced so as to allow for some lateral and angular displacement between the shoes assemblies 34, 35 while maintaining rotational continuity.

Another embodiment may have the interlocking tabs 36 positioned on the support structure 37. Other methods of causing concomitant motion of the shoes are also contemplated such as a pin or rod connecting the shoe assemblies 34, 35 through corresponding holes in each shoe 34, 35.

Figure 4:
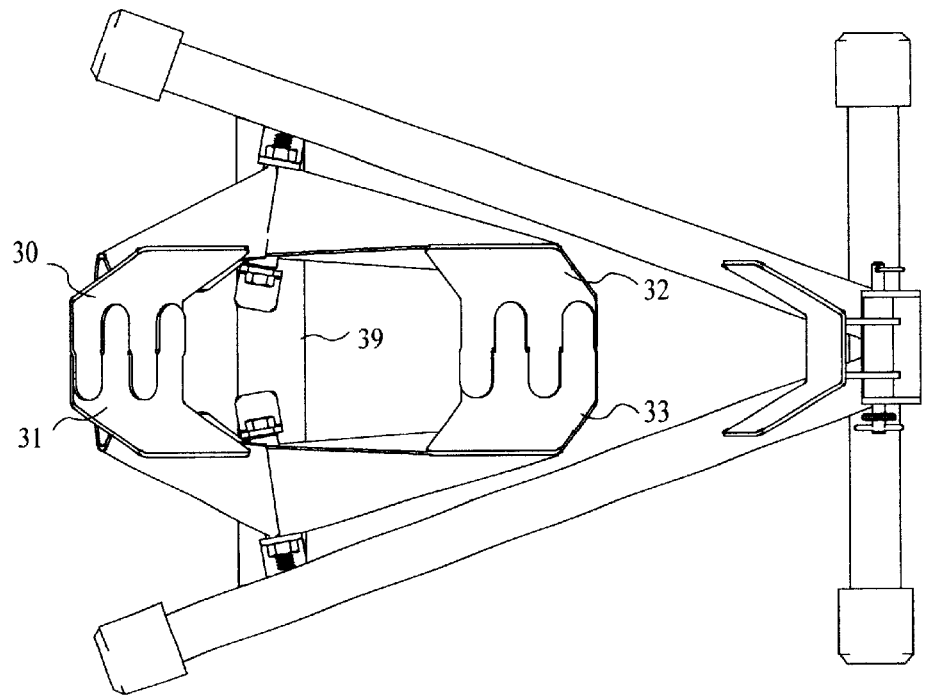
FIG. 4 is a plan view of the alternative embodiment in the engaged position.

With reference to FIG. 3, each shoe assembly 34, 35 is pivotally attached to the support member 39 via a bolt 40 or pin means which allows the assemblies to rotate about axis A and B respectively. Axis A and B remain in a horizontal plane but are angled slightly such that the outward end of each axis A and B is biased toward the forward end of the base 11 at some low angle transverse to the longitudinal axis of the base 11. A configuration is contemplated where the axis A and B do not remain on a horizontal plane but are angled upwards or downwards to achieve the same result. The shoe assemblies 34, 35 are configured so that when rotated forward about the axis A and B the assemblies assume the clamping position shown in FIG. 4. Rotation of the shoe assemblies rearward into the position to accept a motorcycle wheel, as in FIG. 3, causes a separation of the two assemblies 34, 35 at 41 and 42. The separation releases the wheel from the stand and eliminates any "stiction" problems.

Figure 5:
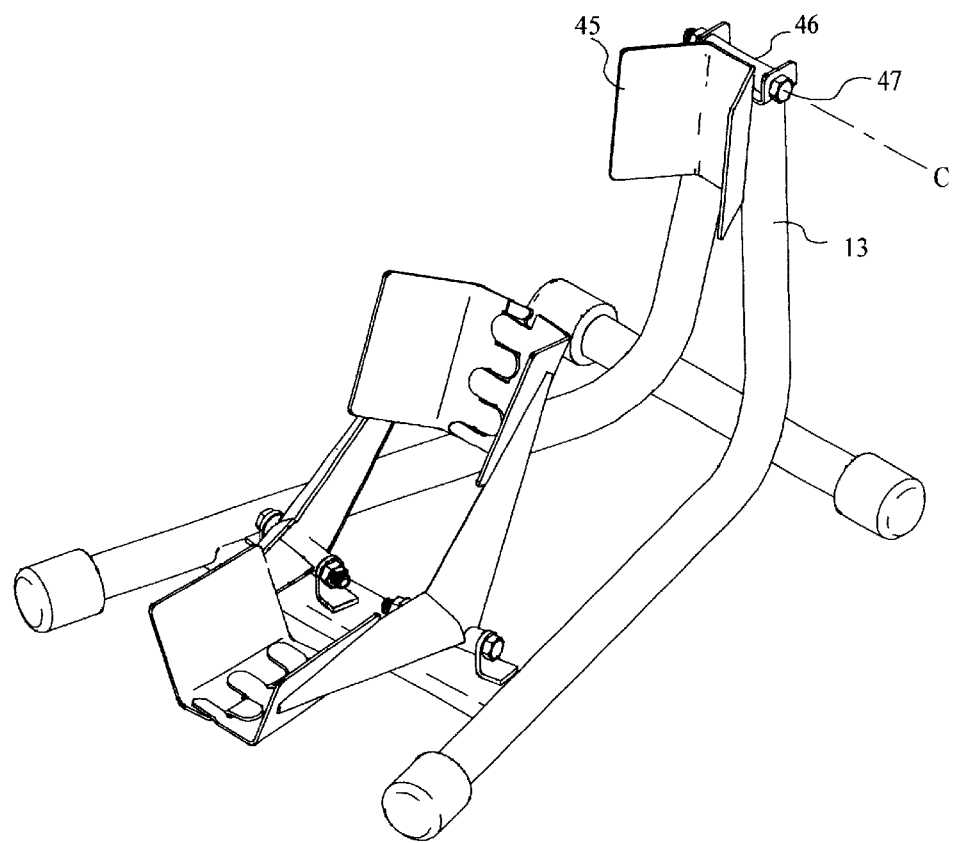
FIG. 5 is a perspective view of the alternative embodiment ready to receive a wheel.
Figure 8:
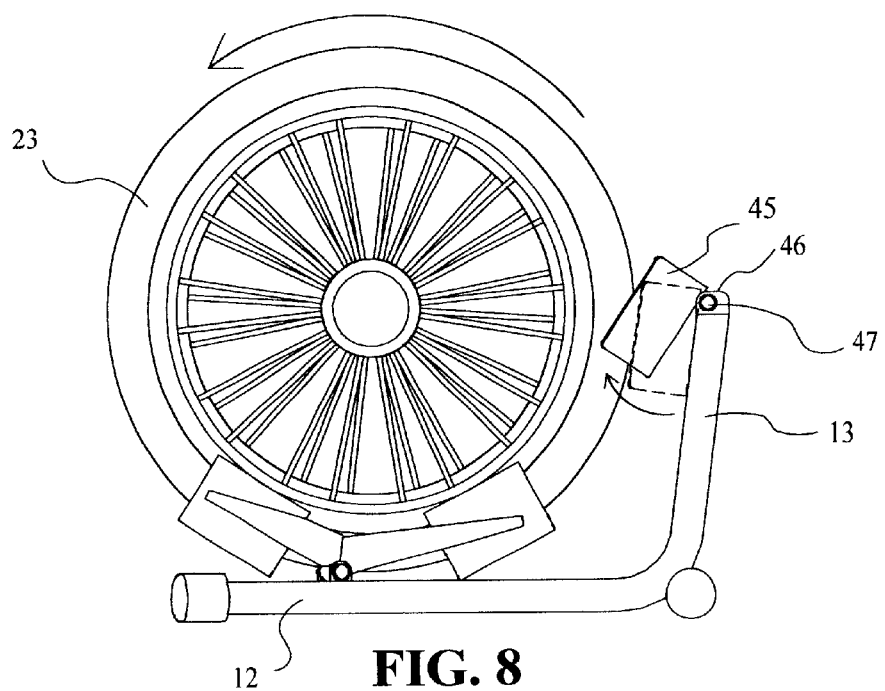
FIG. 8 is an elevational view of the stand showing in detail the pivoting of the third shoe.

A further innovation that will aid in removal of a wheel from the invention disclosed above is a pivoting third shoe 45 as shown in FIG. 5 and FIG. 8. The third shoe 45 is mounted to a tube 46 that is attached by a bolt 47 or pin or other pivoting means to the vertical portion 13 of base 11. Rearward motion of the wheel 23 during removal causes the upper shoe 45 to rotate about axis C, thereby breaking any "stiction" that may be hindering rearward motion of the wheel. The third shoe 45 may also be coated with a non-stick surface on the faces that contact tire 23.

I claim:

1. Apparatus for supporting a motorcycle by engaging a wheel thereof, comprising:
   a. a base for providing lateral support with a forward end and a rearward end;
   b. means pivotally mounted to said base about an axis transverse to said wheel for resiliently engaging said wheel on each side thereof wherein said resiliently engaging means comprises:
      i. a first shoe means with opposing sides for engaging each side of said wheel, said opposing sides disposed outwardly from vertical to facilitate wedging engagement with said wheel; said first shoe means mounted forward of said transverse axis,
      ii. a second shoe means with opposing sides for engaging each side of said wheel, said opposing sides disposed outwardly from vertical to facilitate wedging engagement with said wheel; said second shoe means mounted rearward of said transverse axis, and
   c. a third shoe means with opposing sides mounted to said forward end of said base for arresting the forward motion of said wheel and wedging engagement with said wheel.

2. Apparatus as defined in claim 1 wherein said first shoe means and second shoe means further comprise a non-stick material on said opposing sides.

3. Apparatus as defined in claims 1 or 2 wherein said third shoe means is pivotally mounted to said base about an axis transverse to said wheel.

4. Apparatus for supporting a motorcycle by engaging a wheel thereof, comprising:
   a. a base for providing lateral support with a forward end and a rearward end;
   b. a clamping means for resiliently engaging said wheel on each side thereof; wherein said clamping means comprises:
      i. a left engaging means pivotally mounted to said base for rotation about a left axis lying in the horizontal plane, the left end of said left axis disposed slightly toward said forward end of said base; said left engaging means also comprising means for contacting the left side of said wheel at locations forward and rearward of said left axis;
      ii. a right engaging means pivotally mounted to said base for rotation about a right axis lying in the horizontal plane, the right end of said right axis disposed slightly toward said forward end of said base; said right engaging means also comprising means for contacting the right side of said wheel at locations forward and rearward of said right axis;
      iii. said right engaging means and said left engaging means further comprising cooperating means whereby concomitant motion is maintained between said right engaging means and said left engaging means about said right axis and said left axis respectively; and,
   c. a third shoe means mounted to said forward end of said base for arresting the forward motion of said wheel and wedging engagement with said wheel.

5. Apparatus as defined in claim 4 wherein said right engaging means and left engaging means further comprise a non-stick material on said contacting means.

6. Apparatus as defined in claims 4 or 5 wherein said third shoe means is pivotally mounted to said base about an axis transverse to the longitudinal axis of said base.

7. Apparatus for supporting a motorcycle by engaging a wheel thereof, comprising:

a. a base for providing lateral support with a forward end and a rearward end;
b. a clamping means for resiliently engaging said wheel on each side thereof; wherein said clamping means comprises:
 i. a left engaging means pivotally mounted to said base for rotation about a left axis lying in the horizontal plane, the left end of said left axis disposed slightly toward said forward end of said base; said left engaging means also comprising means for contacting the left side of said wheel at locations forward and rearward of said left axis;
 ii. a right engaging means pivotally mounted to said base for rotation about a right axis lying in the horizontal plane, the right end of said right axis disposed slightly toward said forward end of said base; said right engaging means also comprising means for contacting the right side of said wheel at locations forward and rearward of said right axis;
 iii. said right engaging means and said left engaging means further comprise a plurality of offset tabs that interlock with the opposing engaging means whereby concomitant motion is maintained between said right engaging means and said left engaging means about said right axis and said left axis; and,
c. a third shoe means mounted to said forward end of said base for arresting the forward motion of said wheel and wedging engagement with said wheel.

8. Apparatus as defined in claim 7 wherein said right engaging means and left engaging means further comprise a non-stick material on said contacting means.

9. Apparatus as defined in claims 7 or 8 wherein said third shoe means is pivotally mounted to said base about an axis transverse to the longitudinal axis of said base.

* * * * *